(12) United States Patent
Kirmse et al.

(10) Patent No.: US 8,174,376 B2
(45) Date of Patent: May 8, 2012

(54) DEVICE FOR STATE DEPENDENT OUTPUT OF TONE SEQUENCES IN A MOTOR VEHICLE

(75) Inventors: Stefan Kirmse, Muensing (DE); Georg Friedrich, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 933 days.

(21) Appl. No.: 11/948,255

(22) Filed: Nov. 30, 2007

(65) Prior Publication Data
US 2008/0136615 A1 Jun. 12, 2008

Related U.S. Application Data

(63) Continuation of application No. PCT/EP2006/004580, filed on May 16, 2006.

(30) Foreign Application Priority Data

Jun. 1, 2005 (DE) .......................... 10 2005 025 090

(51) Int. Cl.
*B60Q 1/00* (2006.01)
*H04B 1/00* (2006.01)
(52) U.S. Cl. ........................... 340/438; 340/457; 381/86
(58) Field of Classification Search .......... 340/457–462; 381/86
See application file for complete search history.

(56) References Cited

U.S. PATENT DOCUMENTS

| 5,012,221 | A | * | 4/1991 | Neuhaus et al. | ........... 340/384.5 |
| 6,005,488 | A | * | 12/1999 | Symanow et al. | ....... 340/825.56 |
| 2004/0010352 | A1 | * | 1/2004 | Stromme | .......................... 701/1 |
| 2004/0042624 | A1 | | 3/2004 | Henderson et al. | |

FOREIGN PATENT DOCUMENTS

| DE | 28 19 285 A1 | 11/1979 |
| DE | 31 16668 A1 | 1/1983 |
| DE | 196 41 493 A1 | 4/1998 |
| DE | 197 01 801 C2 | 7/1998 |
| DE | 100 39 756 A1 | 2/2002 |
| DE | 102 12 778 A1 | 10/2003 |
| DE | 103 38 512 A1 | 3/2005 |
| DE | 10 2004 011 953 A1 | 9/2005 |
| EP | 0 899 164 B1 | 3/1999 |
| EP | 1 363 107 A2 | 11/2003 |

OTHER PUBLICATIONS

International Search Report dated Aug. 11, 2006 with an English translation of the pertinent portions (Six (6) pages).
German Search Report dated Nov. 29, 2005 with an English translation of the pertinent portions (Nine (9) pages).

* cited by examiner

*Primary Examiner* — Jennifer Mehmood
(74) *Attorney, Agent, or Firm* — Crowell & Moring LLP

(57) ABSTRACT

A device for state-dependent output of tone sequences in a motor vehicle, which is capable of outputting tone sequences assigned to specific vehicle states and determinable from tone data stored in a memory unit assigned to the motor vehicle, is also capable of directly or indirectly coupling to a computing unit not permanently assigned to the motor vehicle. The set of tone sequences which may be output is changeable as a function of data which may be received from such a computing unit.

20 Claims, 1 Drawing Sheet

DEVICE FOR STATE DEPENDENT OUTPUT OF TONE SEQUENCES IN A MOTOR VEHICLE

CROSS-REFERENCE TO RELATED APPLICATIONS

This application is a continuation of PCT International Application No. PCT/EP2006/004580, filed May 16, 2006, which claims priority under 35 U.S.C. §119 to German Application No. 10 2005 025 090.4, filed Jun. 1, 2005, the entire disclosures of which are expressly incorporated by reference herein.

BACKGROUND AND SUMMARY OF THE INVENTION

The present invention relates to a device for state-dependent output of tone sequences in a motor vehicle, which is capable of outputting tone sequences that are assigned to specific vehicle states and may each be determined from tone data stored in a memory unit situated in the motor vehicle.

In modern motor vehicles, various tone sequences may be artificially generated and output to the vehicle occupants. These include, for example, warning tones, such as an overtaking request of a driver assistance system, or display tones, such as the acoustic feedback of a set vehicle direction indicator (turn signal). The tone sequences are typically generated state-dependently by a computing unit in the instrument cluster of the motor vehicle. The output may occur via a loudspeaker assigned to the instrument cluster or via another acoustic output means, such as the stereo system of the motor vehicle.

A tone sequence is typically to be understood, here, as a sequence of tones which jointly result in a melody, noise, or a realistic tone signal. A tone sequence in the meaning of the present invention may be monophonic or polyphonic, may be completely predefined by tone data or adaptable as a function of the situation, may be provided for a single output or for periodic or aperiodic repetition, and may be provided for output via one or more sound channels.

To communicate acoustic information in a targeted manner to a vehicle occupant, in particular the driver, the generation and output of the tone sequences may be triggered by specific vehicle states. Multiple vehicle states may typically each be assigned at least one tone sequence. The vehicle states relevant for the output of a tone sequence are typically determined by vehicle sensors. Vehicle states are to be understood in this context both as permanent states, such as a vehicle defect, a vehicle light that is on when the ignition is deactivated, or an unbuckled seatbelt with an activated ignition. Also, events, such as falling below a specific temperature value, may be considered vehicle defects.

Before being output, the tone sequences that are to be output are typically determined by the already cited computing unit from tone data which is stored in a memory unit assigned to the motor vehicle. To determine the tone sequences from the tone data and/or to control the tone sequence output, at least one program is executed on the computing unit. In the simplest case, a single program controls both the assignment between vehicle states and tone sequences, and also the determination and output of the tone sequences.

No simple possibility is known from the prior art for changing the set of tone sequences which may be output, in particular adapting them to physiological requirements, habits, and/or preferences of the driver and/or the vehicle occupant.

In particular, there is no possibility according to the prior art for a user of the motor vehicle to change the set of the tone sequences which may be output. The tone data is typically stored jointly with the program data of the program used for determining and/or outputting the associated tone sequences in the memory unit. Such fixed programming of the tone sequences which may be output does not offer the vehicle user a selection capability in relation to the tone sequences.

Motor vehicles which offer the possibility of assigning a tone sequence from a restricted set of preprogrammed tone sequences to specific vehicle states are also known from the prior art. However, the selection capability of the vehicle user is also very limited here. In addition, a separately operable selection unit and/or selection function must be provided with great technical effort.

The present invention provides a device for the state-dependent output of tone sequences in a motor vehicle, which allows a simple change of the set of tone sequences that may be output.

According to the present invention, a device is provided for state-dependent output of tone sequences in a motor vehicle, which is capable of outputting tone sequences that are assigned to vehicle states and which may each be determined from tone data stored in a memory unit assigned to the motor vehicle. The device is also capable of directly or indirectly coupling to a computing unit not permanently assigned to the motor vehicle. The set of tone sequences which may be output is changeable as a function of data which is received from the not permanently assigned computing unit.

Through a device according to the present invention, it is made possible for the vehicle user to change the set of tone sequences which may be output. The vehicle user may thus adapt, or have adapted, the state-dependent output tone sequences to his physiological requirements, habits, and/or preferences in a very flexible manner.

For vehicle manufacturers and/or dealers, a device according to the present invention offers the advantage that a customer-specific solution in regard to the output of tone sequences may be implemented in a simple way. Finding out a preferred establishment of tone sequences, which may be complex under certain circumstances, may be dispensed with, or only occur in a restricted way, because of the possibility of a later change provided according to the present invention.

According to a first variant of the present invention, the set of tone sequences which may be output is changed, in that a device according to the present invention suitable for this purpose receives tone data from a computing unit not permanently assigned to the motor vehicle, to store this data by at least one write access in the memory unit. The tone data of new tone sequences is thus loaded into the memory unit according to this first variant.

If a device according to the present invention is available, for example, tone sequences may be loaded into the vehicle which are optimally tailored to the hearing capability of the driver on the basis of their frequency spectrum. This is also true for tone sequences to which the driver reacts especially sensitively and/or intuitively, because he associates them with specific events or states because of his habits and experiences possibly arising from other areas of his life, or for tone sequences which correspond to the preferences of the driver and/or other vehicle occupants for other reasons, such as aesthetic ones.

The tone sequences loaded into the motor vehicle may be established nearly freely according to this first variant of the present invention within certain technical limits—for example, a file format which may be interpreted by the device. However, legal and/or safety-relevant specifications should still be maintained.

To change the set of tone sequences which may be output, according to the first variant of the present invention, the set of stored tone data is essentially changed. A device according to the present invention is preferably implemented in such a way that it is possible with little effort from a technical viewpoint to change the set of the tone datasets which may be output as tone sequences, in particular to expand this set. Either the memory unit or a specific part thereof preferably exclusively contains tone data, and/or the tone data of at least one tone sequence is storable in a memory area of the memory unit addressable by write accesses.

In the first case cited—the memory unit or a specific part thereof exclusively contains tone data—the memory unit or the corresponding part thereof may be easily overwritten completely or partially with tone data. In the second case, which may especially preferably occur jointly with the first case cited, the tone data of stored tone sequences is changeable in a targeted manner by write accesses, and/or tone data of new tone sequences may be added in a targeted manner. The tone data of a new tone sequence may be written in an available free memory area and/or existing tone data may be overwritten by tone data of a new tone sequence.

If the set of the tone sequences which may be output is changeable in one of the ways specified, the program data used for determining and/or outputting tone sequences may remain unchanged. The set of tone sequences to be output may then possibly even occur during the execution of at least one corresponding program.

Preferably, category data, on the basis of which the corresponding tone sequence is assignable automatically or preferentially to a specific vehicle state, is received jointly with a received tone dataset.

New tone sequences may be loaded into the motor vehicle individually or in groups. Such groups of tone sequences preferably include so-called tone profiles. A tone profile is to be understood as multiple tone sequences tailored to one another for various vehicle states, possibly for all vehicle states relevant for outputting tone sequences.

The receipt of a tone sequence or a tone profile may automatically result in its assignment on the basis of the associated category data. Alternatively, received tone sequences or tone profiles may solely change or expand a set of tone sequences selectable by the vehicle user.

According to a second variant of the present invention, the set of tone sequences which may be output is changed in that a device according to the present invention suitable for this purpose receives program data from the computing unit not permanently assigned to the motor vehicle and, as a function of the received program data, changes the type of playback of stored tone data and/or the assignment between stored tone data and vehicle states. The received program data may either replace a complete program used for assigning, determining, and/or outputting tone sequences or may replace or be added to parts thereof.

In a device according to the present invention of the second variant, all tone sequences for which tone data is stored in the memory unit are initially not also able to be output or selected by the vehicle user. The tone sequences already associated with previously stored tone datasets may first be output, or output in a specific way, by the program which is changed after the receipt of the program data. A tone sequence or a tone profile may be released in a certain way by the receipt and usage of the new program data.

A device according to the second variant of the present invention offers the advantage that there is a selection possibility in regard to the assignment of the tone sequences stored in the motor vehicle, but no separately operable selection unit and/or selection function has to be provided for this purpose.

According to a preferred embodiment of the second variant of the present invention, the set of tone sequences which may be output is changeable in that only assignment data, in particular an assignment (look-up) table, is transmitted as the program data. An assignment table is to be understood as a data construct which is not executable per se as a program, but which a program may use for the purpose of performing an assignment between vehicle states and tone datasets stored in the memory unit and/or the associated tone sequences on the basis of the included assignment data. In such a case, only a very small amount of data has to be transmitted to the device. Instead of transmitting an assignment table, even the reference thereto or a parameter for influencing such a table may possibly be sufficient. This further reduces the amount of data to be transmitted.

A special case of the second variant of the present invention, which is subject to the disadvantage of a very large amount of data to be transmitted, however, includes transmitting a completely new program having tone sequences contained therein to the device according to the present invention. The essential advantages of the first variant of the present invention and of most embodiments of the second variant of the present invention are that only parts of the data required for determining and/or outputting the tone sequences must be transmitted into the motor vehicle from the computing unit not permanently assigned to the motor vehicle.

The first and second variants of the present invention have been described separately up to this point. However, their features may also be advantageously combined. A third variant of the present invention combines the features of the first and second variants of the present invention described above.

A device according to the present invention may be coupled to a computing unit not permanently assigned to the motor vehicle in all variants of the present invention either wirelessly or line-bound in a manner known per se. The coupling capability may be implemented in a targeted manner so that the coupling is producible by the vehicle user himself, automatically by the vehicle, by service personnel, and/or automatically by a service device. The receipt of data from the computing unit and possibly the storage in the memory unit by at least one write access may also be performed in manner known per se. The data transport between a computing unit not permanently assigned to the motor vehicle and a device according to the present invention via a portable storage medium is also to be understood as coupling in the meaning of the present invention.

The received data is preferably retrieved by the computing unit upon request on the part of the device according to the present invention. Alternatively or additionally, a device according to the present invention may be capable of using incoming tone data either checked or unchecked and possibly writing it into the memory unit.

Preferably, the type and number of retrieved datasets and/or further information on these datasets and/or their receipt are detected on the part of the computing unit not permanently assigned to the motor vehicle or a further computing unit connected to this computing unit. This allows the provider of the computing unit not permanently assigned to the motor vehicle to link a payment system to the provision of the data. Alternatively or additionally, the coupling of the computing unit and/or the provision of the data may be executed for this purpose such that it only occurs upon the provision of identification or payment data on the part of the vehicle user and/or the vehicle.

According to a preferred embodiment of the present invention, the memory unit is part of the instrument cluster or the so-called head unit of the motor vehicle. The input and output interfaces of existing systems according to the prior art may thus be completely or extensively maintained. In addition, separate mounting effort is dispensed with for the memory unit during the vehicle mounting and no additional installation space has to be provided during the vehicle planning and development.

According to an especially preferred embodiment of the present invention, the complete device according to the present invention is part of the instrument cluster of the motor vehicle. The above-mentioned advantages in regard to interfaces, mounting, planning, and development also apply in this case.

If not explicitly specified otherwise or otherwise obvious from the present context, tone data in the meaning of the present invention may be embedded in program data. The second variant of the present invention is particularly usable even in such a case.

According to a first refinement of the present invention, a device according to the present invention provides the possibility of personalizing and/or individualizing the tone sequences which may be output and/or the assignment between vehicle states and corresponding tone sequences to be output. According to this first refinement of the present invention, changes of the set of tone sequences which may be output and/or changes of the assignment between vehicle states and corresponding tone sequences to be output may only relate to selected user profiles. Various user profiles may be automatically activatable in a manner known per se on the basis of various vehicle keys, for example.

According to a second refinement of the present invention, a device according to the present invention has a preset device or is coupled to such a device, via which the assignment between vehicle states and corresponding tone sequences to be output is adaptable for all vehicle users or for specific user profiles.

Other objects, advantages and novel features of the present invention will become apparent from the following detailed description of the invention when considered in conjunction with the accompanying drawings.

DETAILED DESCRIPTION OF THE DRAWINGS

Figure 1:
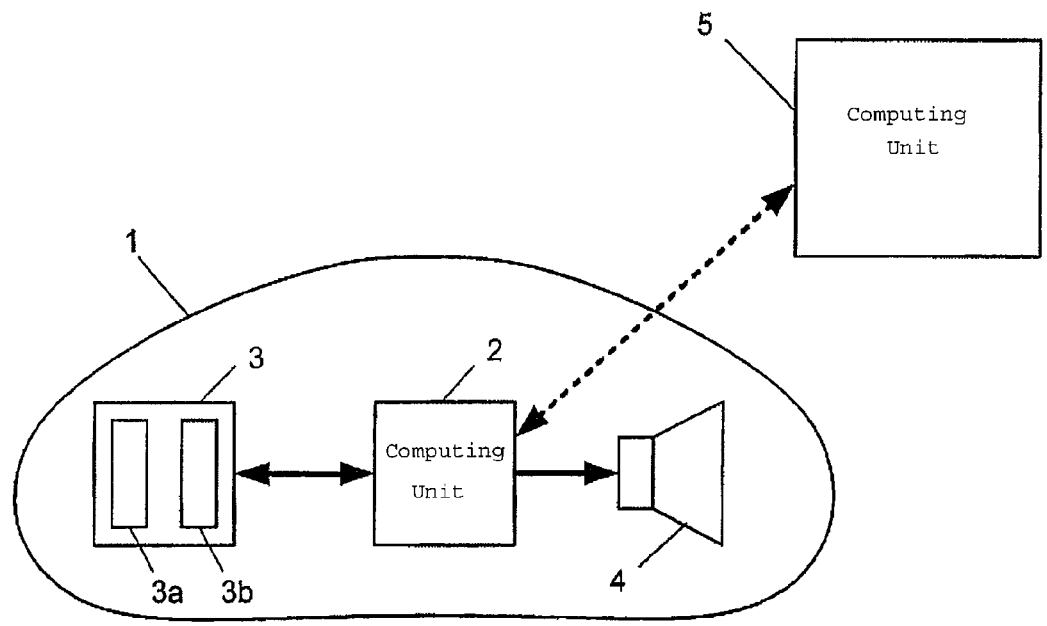
FIG. 1 is a schematic diagram of a device according to a preferred embodiment of the first variant of the present invention and its coupling to a computing unit not permanently assigned to the motor vehicle.

FIG. 1 schematically shows a device according to a preferred embodiment of the first variant of the present invention and its coupling to a computing unit not permanently assigned to the motor vehicle.

The device according to the present invention is part of an instrument cluster 1 in a motor vehicle and includes a computing unit 2, a memory unit 3, and a loudspeaker 4.

The memory unit 3 contains a memory part 3a functioning as a tone data memory and a memory part 3b functioning as a program data memory.

The computing unit 2 of the device according to the present invention is temporarily connectable wirelessly to a computing unit 5 located outside the motor vehicle. The computing unit 5 initially does not communicate with the computing unit 2.

The device according to the present invention is capable of state-dependent output of tone sequences. The particular vehicle state is determined by vehicle sensors (not shown here), which are analyzed in the computing unit 2 or another computing unit of the motor vehicle.

In an initialization phase, program data is loaded from the program data memory 3b into the computing unit 2 and executed therein as a program. The program is capable of accessing tone data in the tone data memory 3a. Tone datasets for multiple tone sequences are stored therein, which may be individually retrieved by the computing unit at the program runtime. The program assigns a tone sequence and/or a tone dataset to every vehicle state on the basis of assignment data contained in the program data. In the embodiment of the present invention shown here, every tone dataset stored in the tone data memory 3a is assigned to a vehicle state.

If a specific vehicle state occurs, the computing unit 2, controlled by the executed program, retrieves the associated tone data from the tone data memory 3a, determines a tone sequence therefrom, and outputs it via the loudspeaker 4.

When the computing unit 5 signals its readiness for communication, the computing unit 2 establishes a communication link thereto. The link is established according to security criteria known per se, which include the query of authorizations, inter alia. After the computing unit 2 has signaled its readiness, the computing unit 5 transmits at least one tone dataset to the computing unit 2. For the sake of simplicity, the transmission of a single tone dataset A is described here. The computing unit 2 receives the tone dataset A and analyzes it in regard to category data which is also transmitted. The category data assigns the tone dataset A to a specific vehicle state Q. The computing unit 2 determines this vehicle state Q and stores the received tone dataset A precisely at the point of the tone data memory 3a at which another tone dataset B was previously stored, which was assigned to the vehicle state Q. The targeted storage may be performed in this way because the memory area of the tone data memory 3a, in which the tone dataset B was stored, is addressable by write accesses of the computing unit 2. The tone dataset B is overwritten by the storage of the tone dataset A. Upon the next occurrence of the vehicle state Q, the tone sequence associated with the tone dataset A is output.

Figure 2:
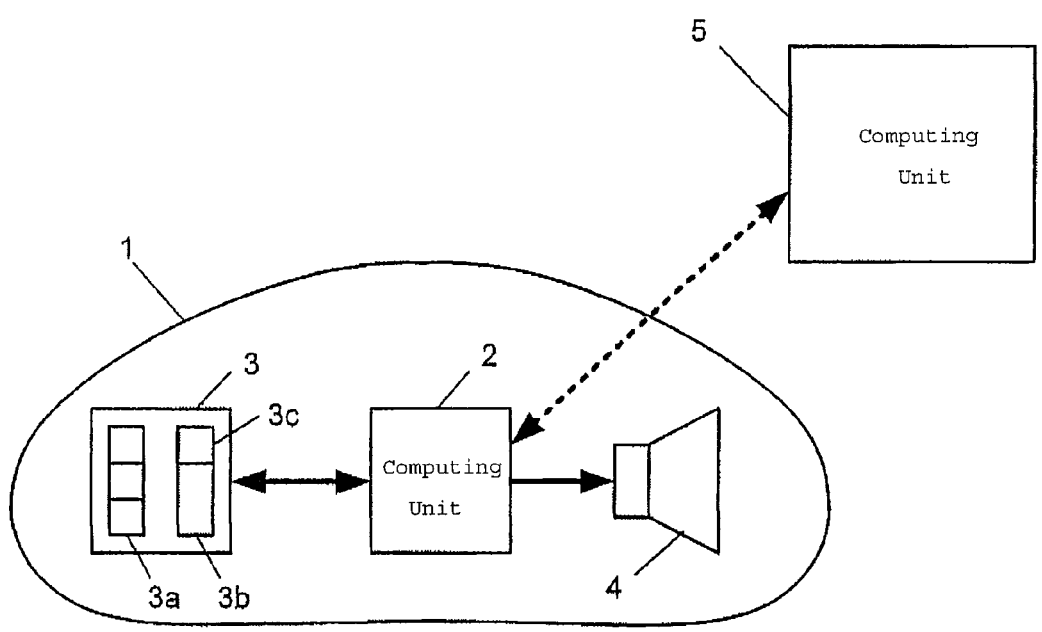
FIG. 2 is a schematic diagram of a device according to a preferred embodiment of the second variant of the present invention and its coupling to a computing unit not permanently assigned to the motor vehicle.

A device according to a preferred embodiment of the second variant of the present invention and its coupling to a computing unit not permanently assigned to the motor vehicle are schematically shown in FIG. 2.

The device shown in FIG. 2 only differs slightly in its hardware architecture from that in FIG. 1, but has another allocation of the memory unit 3.

A memory area 3c is separately reserved for an assignment or look-up table in the program data memory 3b. The assignment table represents a part of the program data and is loadable into the computing unit 2 together with the remaining program data stored in the program data memory 3b in an initialization phase. The program data is executed as a program by the computing unit 2. The assignment data contained in the assignment table establishes, as already described, the assignment between vehicle states and tone sequences.

In the present example, the tone data memory 3a contains multiple memory areas, three here, which each contain the tone datasets of a tone profile. In the present example, such a tone profile includes multiple tone sequences tailored to one another, which are sufficient for acoustically representing all vehicle states. Correspondingly, the assignment table exclusively assigns tone sequences from a single tone profile of the three tone profiles to the vehicle states. Tone datasets are stored in the tone data memory 3a for the tone sequences of the other two tone profiles, but these may not be output by the device for the time being.

Otherwise, the function of the device shown in FIG. 2 differs little from the function of the device in FIG. 1, as long as the device is not connected to the computing unit 5. If a specific vehicle state occurs, the computing unit 2, controlled by the executed program, retrieves the associated tone data from the tone data memory 3a, determines a tone sequence therefrom, and outputs it via the loudspeaker 4.

While in the device of FIG. 1, tone data was loadable from the computing unit 5 into the device and storable in the memory unit 3, in the case of the device of FIG. 2, program data is loadable into the device and storable in the memory unit 3. In the present example, after the establishment of a communication link (as already described above), a new assignment table is received. This table is loaded into the memory area 3c. The newly received assignment table preferably provides a different assignment between vehicle states and tone sequences than the assignment table previously stored in the memory area 3c. In the present example, the newly received assignment table also assigns all relevant vehicle states to tone sequences of a single tone profile.

The new assignment is effective after the next initialization phase. A new tone profile is activated and/or released instead of the current tone profile by the described sequences. With appropriate execution of the program, a new assignment table may also be integrated into the program at the program runtime.

According to the example of the second variant of the present invention described, instead of tone data, a program or large program parts, only an assignment table has to be transmitted to the device according to the present invention. Thus, the amount of data to be transmitted is very small. This is a great advantage when using a wireless transmission, but is also advantageous with wire-bound transmissions.

According to a special embodiment of the present invention (not explained in greater detail here), the structures of the three memory areas of the tone data memory 3a, each occupied, by one tone profile, and the program structure are designed in such a way that instead of a new assignment table, only a reference to another of the three available tone profiles has to be transmitted to the device to activate and/or release the corresponding tone profile. The amount of data to be transmitted may thus be reduced still further. The assignment data does not necessarily have to be organized in the form of an assignment table having a separately reserved memory area in this case.

The receipt of tone data in the first example described on the basis of FIG. 1 and the receipt of the assignment table in the second example described on the basis of FIG. 2 may be automatically linked in a manner known per se to a payment procedure.

The capabilities of a device according to the present invention as described here on the basis of various embodiments of the present invention, in particular the capability of receiving new tone data and the capability of receiving new program data, may advantageously be combined with one another in various ways. The scope of the present invention includes such combinations.

The combination of a device according to the present invention with a selection unit or selection function, which is complex per se, also has decisive advantages in relation to the prior art. One such advantage is the significant expansion of the spectrum of possible tone sequences caused by the capability of receiving new tone data.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A device for state-dependent output of tone sequences in a motor vehicle, the vehicle being capable of outputting tone sequences that are assigned to vehicle states and determinable from tone data stored in a memory unit of the motor vehicle, the device comprising:
    an interface for directly or indirectly coupling the device to a computing unit that is not permanently assigned to the vehicle; and
    wherein the device is operably configured to change the set of tone sequences which may be output as a function of data received through the interface from a computing unit not permanently assigned to the vehicle.

2. The device according to claim 1, wherein the device is capable of receiving tone data or a tone dataset from the computing unit not permanently assigned to the motor vehicle, and stores the received tone data or tone dataset by at least one write access in the memory unit.

3. The device according to claim 2, wherein the memory unit, or a part thereof, exclusively contains tone data.

4. The device according to claim 2, wherein the memory unit contains further data in addition to the tone data; and
    further wherein the tone data of at least one tone sequence is storable in a memory area of the memory unit which is addressable by write accesses.

5. The device according to claim 2, wherein the tone sequence associated with a received tone dataset is automatically or preferentially assignable to a specific vehicle state on the basis of category data received with the tone dataset.

6. The device according to claim 3, wherein the tone sequence associated with a received tone dataset is automatically or preferentially assignable to a specific vehicle state on the basis of category data received with the tone dataset.

7. The device according to claim 4, wherein the tone sequence associated with a received tone dataset is automatically or preferentially assignable to a specific vehicle state on the basis of category data received with the tone dataset.

8. The device according to claim 1, wherein the device is capable of receiving program data from the computing unit not permanently assigned to the motor vehicle; and
    further wherein at least one of a playback type of stored tone data and an assignment between stored tone data and vehicle states are changeable as a function of the received program data.

9. The device according to claim 2, wherein the device is capable of receiving program data from the computing unit not permanently assigned to the motor vehicle; and
    further wherein at least one of a playback type of stored tone data and an assignment between stored tone data and vehicle states are changeable as a function of the received program data.

10. The device according to claim 3, wherein the device is capable of receiving program data from the computing unit not permanently assigned to the motor vehicle; and further wherein at least one of a playback type of stored tone data and an assignment between stored tone data and vehicle states are changeable as a function of the received program data.

11. The device according to claim 4, wherein the device is capable of receiving program data from the computing unit not permanently assigned to the motor vehicle; and further wherein at least one of a playback type of stored tone data and an assignment between stored tone data and vehicle states are changeable as a function of the received program data.

12. The device according to claim 5, wherein the device is capable of receiving program data from the computing unit not permanently assigned to the motor vehicle; and further wherein at least one of a playback type of stored tone data and an assignment between stored tone data and vehicle states are changeable as a function of the received program data.

13. The device according to claim 8, wherein the assignment between stored tone data and vehicle states is changeable, in that only assignment data is transmitted as program data.

14. The device according to claim 13, wherein the assignment data is an assignment table.

15. The device according to claim 1, wherein the memory unit is part of an instrument cluster or head unit of the motor vehicle.

16. The device according to claim 1, wherein the entire device is part of an instrument cluster or head unit of the motor vehicle.

17. A method of outputting state-dependent tone sequences in a motor vehicle, a first set of tone sequences being assigned to vehicle states and being stored in a memory unit of the vehicle, the method comprising the acts of:

receiving, in the vehicle, data from a computing unit not permanently assigned to the vehicle; and changing the first set of tone sequences as a function of the received data.

18. The method according to claim 17, wherein the received data is at least one of tone data and a tone dataset, the at least one of tone data and tone dataset being stored in a memory unit of the vehicle for output as the changed tone sequences.

19. The method according to claim 17, wherein the received data is program data.

20. The method according to claim 19, wherein the program data is an assignment table.

* * * * *